United States Patent
Brown et al.

(10) Patent No.: US 7,314,685 B2
(45) Date of Patent: Jan. 1, 2008

(54) OXIDIZED TITANIUM AS A CATHODIC CURRENT COLLECTOR

(75) Inventors: W. Richard Brown, Clarence Center, NY (US); Christine A. Frysz, Columbia, MD (US); Sally Ann Smesko, North Tonawanda, NY (US); Esther S. Takeuchi, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 646 days.

(21) Appl. No.: 10/680,698

(22) Filed: Oct. 7, 2003

(65) Prior Publication Data

US 2004/0131943 A1    Jul. 8, 2004

Related U.S. Application Data

(63) Continuation-in-part of application No. 09/918,139, filed on Jul. 30, 2001, now abandoned.

(51) Int. Cl.
 *H01M 4/66* (2006.01)
(52) U.S. Cl. .............. 429/245; 429/241; 429/236; 429/242; 429/233; 429/169; 429/219; 429/231.5; 429/220; 429/224; 429/223; 429/231.1; 429/231.8; 429/231.7
(58) Field of Classification Search ........ 429/245, 429/241, 236, 242, 233, 169, 219, 231.5, 429/220, 224, 223, 231.1, 231.8, 231.7; 29/2
 See application file for complete search history.

(56) References Cited

U.S. PATENT DOCUMENTS

| | | | |
|---|---|---|---|
| 2,949,411 A | 8/1960 | Beck | |
| 3,346,469 A | 10/1967 | Weigel | |
| 3,499,782 A | 3/1970 | Shockley | |
| 3,959,091 A | 5/1976 | Moji et al. | |
| 4,019,970 A | 4/1977 | Fritz et al. | |
| 4,181,754 A | 1/1980 | McKinzie et al. | |
| 4,391,729 A | 7/1983 | Liang et al. | |
| 4,411,825 A | 10/1983 | Domeniconi | |
| 5,114,432 A | 5/1992 | Plichta et al. | |
| 5,114,810 A | 5/1992 | Frysz et al. | |
| 5,160,599 A | 11/1992 | Kobayashi et al. | |
| 5,185,182 A | 2/1993 | Brown | |
| 5,211,832 A | 5/1993 | Cooper et al. | |
| 5,221,459 A | 6/1993 | Okano et al. | |
| 5,521,029 A | 5/1996 | Fiorino et al. | |
| 5,670,278 A | 9/1997 | Disselbeck et al. | |

FOREIGN PATENT DOCUMENTS

JP  59-186263  * 10/1984

* cited by examiner

*Primary Examiner*—Laura Weiner
(74) *Attorney, Agent, or Firm*—Michael F. Scalise

(57) ABSTRACT

A titanium substrate having a thickened outer oxidation layer provided thereon by a treatment process performed either in an air atmosphere at elevated temperatures or through electrolytic oxidation (anodization), is described. The thusly conditioned titanium substrate serving as a cathode current collector for an electrode incorporated into an electrochemical cell exhibits improved electrical performance in comparison to the prior art techniques, i.e., electrically conducted carbon coated titanium screen and use of highly corrosion resistant materials, upon subsequent elevated temperature exposure.

12 Claims, 9 Drawing Sheets

OXIDIZED TITANIUM AS A CATHODIC CURRENT COLLECTOR

CROSS-REFERENCE TO RELATED APPLICATION

This application is a continuation-in-part of application Ser. No. 09/918,139, filed Jul. 30, 2001, now abandoned.

BACKGROUND OF THE INVENTION

1. Field of the Invention

The present invention generally relates to the conversion of chemical energy to electrical energy, and more particularly, to the treatment of a conductive substrate intended for subsequent use as a cathodic current collector. According to the present invention, heating in an oxidizing atmosphere or through electrolytic oxidation substantially thickens the naturally occurring passivating oxide surface layer on a metallic current collector. The thusly-conditioned conductive substrate improves the efficiency of a subsequently constructed cell, especially an alkali metal electrochemical cell discharged at an elevated temperature.

2. Prior Art

Titanium metal cathode current collectors generally exhibit the excellent corrosion resistance and other characteristics needed to function in the electrochemically challenging environments existing within lithium/carbon monofluoride ($Li/CF_x$) cells. However, under certain storage and/or elevated temperature treatment or discharge conditions, use of titanium current collectors results in poor or degraded cell performance. For example, current collector and cell performance can be degraded by long term storage at ambient temperature, by short-term exposure to medical autoclave temperatures, and by high temperature discharge in commercial environments, such as down-hole in oil and gas wells. Degraded cell performance characteristics include voltage fluctuations during discharge, reduced running voltages, increased internal impedances, and reduced delivered capacities.

Prior art measures to avoid the adverse effects of titanium current collectors on cell performance resulting from storage or elevated temperature exposure have drawbacks. One such measure consists of coating an electrically conductive carbon paint suspension onto titanium cathode screens. However, variations in coating thickness and in adherence quality are but two of the factors making this a cumbersome process.

U.S. Pat. No. 5,670,278 to Disselbeck et al. discloses titanium supports and electrodes for primary and secondary electric cells. At column 7, lines 37 to 42, this patent teaches that if "the titanium-coated active-material support of the present invention is to be used for manufacturing negative electrodes, it is advantageous to effect the coating with a titanium which has been passivated with small amounts of oxidizing metal ions. Examples of such metal ions are $Cu^{2+}$, $Fe^{3+}$ and $Cr^{4+}$."

However, the presence of metallic ions other than those intended to promote electrochemical discharge can cause parasitic side reactions. In the present electrochemical system, lithium ions intercalate into the cathode active material where they are converted into atomic or molecular forms. The presence of $Cu^{2+}$, $Fe^{3+}$ and $Cr^{4+}$ ions may interfere with these intended reactions as well as promote self-discharge and, consequently, depleted discharge capacity.

U.S. Pat. No. 5,114,810 to Frysz et al., which is assigned to the assignee of the present invention and incorporated herein by reference, discloses subjecting a titanium current collector screen to an atmosphere of 90% relative humidity for 30 hours then baking the screen in a 110° C. vacuum oven for 20 hours. However, the thusly-treated screen exhibited pitting corrosion. The likely reason for this is that the titanium oxide layer was too thick, and the differential stresses between it and the titanium base were too great. Having too large a disparity between the stress forces likely resulted in delamination of the titanium oxide layer from the base layer, which ultimately lead to corrosion of the titanium base. According to the present invention, the differential stresses between the passivating titanium oxide layer and the titanium base need to be as low as possible to prevent cracking and flaking leading to delamination and corrosion.

Another prior art measure is to abandon titanium and employ screens made from other highly corrosion resistant alloys such as high chromium ferritic stainless steels or cobalt-nickel alloys. Many of these alloys tend to be inherently expensive and difficult to form into screens by cost-efficient processes. Furthermore, the relatively lightweight of titanium is preferable and advantageous in many battery applications.

It is important to the understanding of the present invention to note that in the prior art involving the use of uncoated titanium current collectors, the titanium surface includes a very thin, invisible oxide layer that forms naturally on pure and alloyed titanium. This layer forms spontaneously in the presence of an oxygen source during mechanical and chemical forming processes including sheet/foil rolling, wire drawing, and chemical photo etch fabrication of screens. It is known to those familiar with the art that the oxide layer on titanium rapidly reaches a self-limited thickness under ambient or modestly elevated temperature conditions. It is, therefore, a premise of the present invention that conditioning the current collector in an oxidizing atmosphere increases the thickness of the titanium oxide layer.

SUMMARY OF THE INVENTION

Accordingly, the present invention is directed to a conditioned titanium metal substrate having a substantially thickened outer oxidation layer provided by a treatment process performed in an oxygen-containing atmosphere at elevated temperatures, or through electrolytic oxidation (anodization). Upon subsequent elevated temperature exposure, the conditioned titanium substrate serving as a cathode current collector incorporated into an electrochemical cell exhibits improved electrical performance in comparison to titanium substrates manufactured by prior art techniques, i.e., electrically conductive carbon coated titanium screens and use of highly corrosion resistant alloys other than titanium. In fact, improved discharge performance is maintained even after the cell has been subjected to several high temperature exposures. The oxide thickening treatment of this invention is practical and economical; in its simplest form the treatment consists of heating screens or stock in a furnace containing an air atmosphere.

These and other aspects of the present invention will become more apparent to those skilled in the art by reference to the following description and to the appended drawings.

DETAILED DESCRIPTION OF THE INVENTION

The present invention provides a positive electrode current collector for alkali metal, solid cathode, and liquid organic electrolyte electrochemical cells. The preferred current collector material comprises the so-called Commercially Pure (CP) or unalloyed grades of titanium. These materials are known as ASTM Grades 1 through 4, differing only slightly in chemical composition but substantially in mechanical properties. It is within the scope of the present invention that other titanium alloys available in sheet or foil form are useful for conditioning to provide them with an oxide-thickened surface layer. The titanium substrate material may be in the form of a screen, foil, or sheet and, preferably, has a thickness of about 0.001 inches to about 0.010 inches.

According to the present invention, an as-received titanium substrate is conditioned with a thickened outer oxidation layer in an oxidizing atmosphere at an elevated temperature or through electrolyte oxidation. Air oxidation takes place by heating the screen in an oxidizing atmosphere at a temperature of about 200° C. to about 450° C. for a period of time ranging from about 24 hours down to about 5 minutes for the highest temperatures. A preferred oxidizing protocol comprises heating the screen at a temperature of about 300° C. for about 30 minutes in air.

Another embodiment of the present invention comprises immersing the titanium material in an electrolytic bath, such as a 10% oxalic acid solution, at an applied voltage ranging from about 3 volts to about 30 volts for a time period ranging from about 0.5 periods to about 60 seconds.

Figure 1:
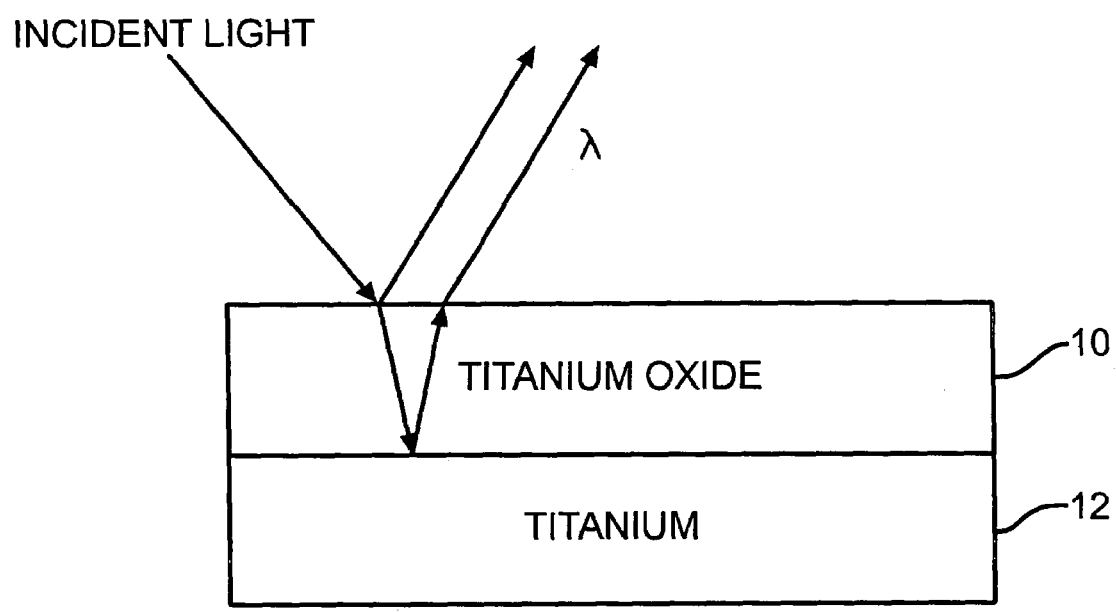
FIG. 1 is a schematic representation of light incident a titanium oxide layer on a titanium substrate.

As shown in FIG. 1, either treatment technique results in the provision of a substantially thickened outer layer of titanium oxide 10 on the exposed surface of the titanium substrate 12. Thickness of the titanium oxide layer at maximum reflection is calculated as:

$$2nt = m\lambda,$$

where n is the refractive index, m is the reflection order, $\lambda$ is the wavelength of the reflected light, and t is the thickness of the thin film. Thickness of the titanium oxide layer at minimum reflection is calculated as:

$$2nt = (m+\tfrac{1}{2})\lambda$$

The observed color from titanium oxide thin layer is assumed to be 600 nm±50 nm. According to "Optical Properties of Spin-On Deposited Low-Temp Titanium Oxide Thin Films", by J T Rantala and A H O Kärkkäinen, University of Oahu, the refractive index for a titanium oxide thin layer exposed to ~300° C. is 2.03. If one assumes first order reflections, then m=1. Then, using the above formulas, a preferred titanium oxide thickness ranges from about 135 nm to about 240 nm (nanometers).

When such a conditioned titanium material is used as the current collector for the cathode of a primary alkali metal electrochemical cell or the positive electrode of a lithium-ion secondary cell, such cell types are known to exhibit improved discharge performance and reduced impedance in comparison to unconditional titanium material incorporated into electrochemical electrodes.

Accordingly, the conditioned titanium current collector material of the present invention is useful in electrochemical cells of both a primary and a secondary configuration. The primary configuration can include a positive electrode of either a solid cathode active material supported on the current collector or a liquid catholyte system having a carbonaceous material supported on the conditioned titanium current collector. The cathode active material is selected from the group consisting of silver vanadium oxide, copper silver vanadium oxide, copper vanadium oxide, manganese dioxide, cobalt oxide, nickel oxide, copper oxide, titanium disulfide, copper sulfide, iron sulfide, iron disulfide, carbon, fluorinated carbon, and mixtures thereof.

Regardless of the cell configuration, such cells preferably comprise an anode active material of a metal selected from Groups IA, IIA or IIIB of the Periodic Table of the Elements, including the alkali metals lithium, sodium, potassium, etc., and their alloys and intermetallic compounds including, for example, Li—Si, Li—Al, Li—B and Li—Si—B alloys and intermetallic compounds. The preferred anode active material comprises lithium, and the more preferred anode for a primary cell comprises a lithium alloy such as a lithium-aluminum alloy. However, the greater the amounts of aluminum present by weight in the alloy, the lower the energy density of the cell.

In a primary cell, the form of the anode may vary, but preferably the anode is a thin metal sheet or foil of the anode metal, pressed or rolled on a metallic anode current collector, i.e., preferably comprising nickel, to form an anode component. The anode component has an extended tab or lead of the same material as the anode current collector, i.e., preferably nickel, integrally formed therewith and contacted by a weld to a cell case of conductive metal in a case-negative electrical configuration. Alternatively, the anode may be formed in some other geometry, such as a bobbin shape, cylinder or pellet to allow an alternate low surface cell design.

Whether the cell is constructed as a primary or secondary electrochemical system, it includes a separator to provide physical segregation between the anode and cathode electrodes. The separator is of electrically insulative material that is chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, ionically conductive electrolyte that serves as a medium for migration of ions between the anode and the cathode electrodes during the electrochemical reactions of the cell. Thus, nonaqueous electrolytes suitable for the present invention are substantially inert to the anode and cathode materials, and they exhibit those physical properties necessary for ionic transport, namely, low viscosity, low surface tension and wettability.

Suitable nonaqueous electrolyte solutions that are useful in both the present primary and secondary cells having an electrode couple of alkali metal or an alkali metal-containing material, and a solid active material counterelectrode preferably comprise a combination of a lithium salt and an organic solvent system. More preferably, the electrolyte includes an ionizable alkali metal salt dissolved in an aprotic organic solvent or a mixture of solvents comprising a low viscosity solvent and a high permittivity solvent. The inorganic, ionically conductive salt serves as the vehicle for migration of the alkali metal ions to intercalate into the counterelectrode. Preferably, the ion-forming alkali metal salt is similar to the alkali metal comprising the anode active material. Suitable salts include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof. Suitable salt concentrations typically range between about 0.8 to 1.5 molar.

In electrochemical systems having a solid cathode or in secondary cells, the nonaqueous solvent system comprises low viscosity solvents including tetrahydrofuran (THF), methyl acetate (MA), diglyme, trigylme, tetragylme, dimethyl carbonate (DMC), ethyl methyl carbonate (EMC), 1,2-dimethoxyethane (DME), diisopropylether, 1,2-diethoxyethane, 1-ethoxy, 2-methoxyethane, dipropyl carbonate, ethyl methyl carbonate, methyl propyl carbonate, ethyl propyl carbonate, diethyl carbonate, and mixtures thereof. While not necessary, the electrolyte also preferably includes a high permittivity solvent selected from cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-butyrolactone (GBL), γ-valerolactone, N-methyl-pyrrolidinone (NMP), and mixtures thereof. For a solid cathode primary or secondary cell having lithium as the anode active material, such as of the Li/SVO couple, the preferred electrolyte is $LiAsF_6$ in a 50:50, by volume, mixture of PC/DME. For a $Li/CF_x$ cell, the preferred electrolyte is 1.0M to 1.4M $LiBF_4$ in γ-butyrolactone.

The preferred form of a primary alkali metal/solid cathode electrochemical cell is a case-negative design wherein the anode is in contact with a conductive metal casing and the cathode contacted to the conditioned titanium current collector is the positive terminal. In a secondary electrochemical cell having a case-negative configuration, the anode (counter electrode)/cathode couple is inserted into a conductive metal casing connected to the carbonaceous counter electrode current collector, and the lithiated material is contacted to a second current collector, which also preferably is of conditioned titanium according to the present invention. In either case, the current collector for the lithiated material or the cathode electrode is in electrical contact with the positive terminal pin via a lead of the same material as the current collector.

A preferred material for the casing is titanium although stainless steel, mild steel, nickel-plated mild steel and aluminum are also suitable. The titanium casing can be conditioned in a manner according to the present invention. The casing header comprises a metallic lid having an opening to accommodate the glass-to-metal seal/terminal pin feedthrough for the cathode electrode. The anode electrode or counter electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto. The cell of the present invention can also be constructed in a case-positive design.

The electrochemical cell of the present invention comprising the conditioned titanium substrate as the positive electrode current collector operates in the following manner. When the ionically conductive electrolytic solution becomes operatively associated with the anode and the cathode of the cell, an electrical potential difference is developed between terminals operatively connected to the anode and the cathode. The electrochemical reaction at the anode includes oxidation to form metal ions during cell discharge. The electrochemical reaction at the cathode involves intercalation or insertion of ions that migrate from the anode to the cathode and conversion of those ions into atomic or molecular forms.

The following examples describe the manner and process of manufacturing and discharging an electrochemical cell according to the present invention, and they set forth the best mode contemplated by the inventors of carrying out the invention, but they are not to be construed as limiting.

EXAMPLE I

Six substantially similar titanium screens were divided into two groups of three screens each. The first group, serving as a control, was not conditioned. It was inferred from the colorless gray metallic appearance of these screens that the surface oxide present was the typical thin invisible layer known to form during mechanical and chemical processing at temperatures near ambient. The second group of three screens was conditioned by heating in air at about 300° C. for about 30 minutes. The presence of an augmented (thickened) oxide on the conditioned screens was confirmed by a visible color change to a light to moderate straw color.

Those who have studied the growth of oxides on metals know that the initial colors developing as oxide thickening progresses are due to optical interference colors. That is, when a certain oxide thickness range is reached, wavelengths of light visible to the human eye are reinforced such that a color is perceived. A straw color is typically the first one seen on many oxidized metals.

Further confirmation of oxide thickness growth due to the oxidation treatments of this invention was confirmed by noting changes in the x-ray (EDS) spectra of screens examined in a scanning electron microscope (SEM). While the EDS analyses were not quantitative, very clear semi-quantitative data was obtained by careful side-by-side comparison of the control and oxidized samples using low (5 keV)

electron beam voltage in the SEM to enhance EDS sensitivity to surface layer composition.

Figure 2:
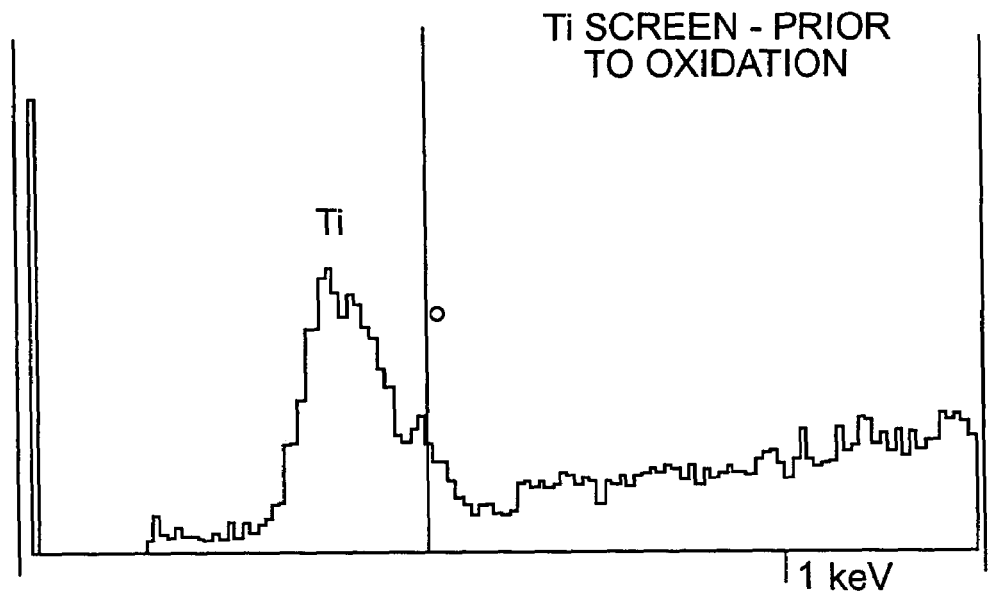
FIGS. 2 and 3 show the EDS spectra of a prior art untreated titanium screen and a thermally oxide-thickened titanium screen according to the present invention, respectively.
Figure 3:
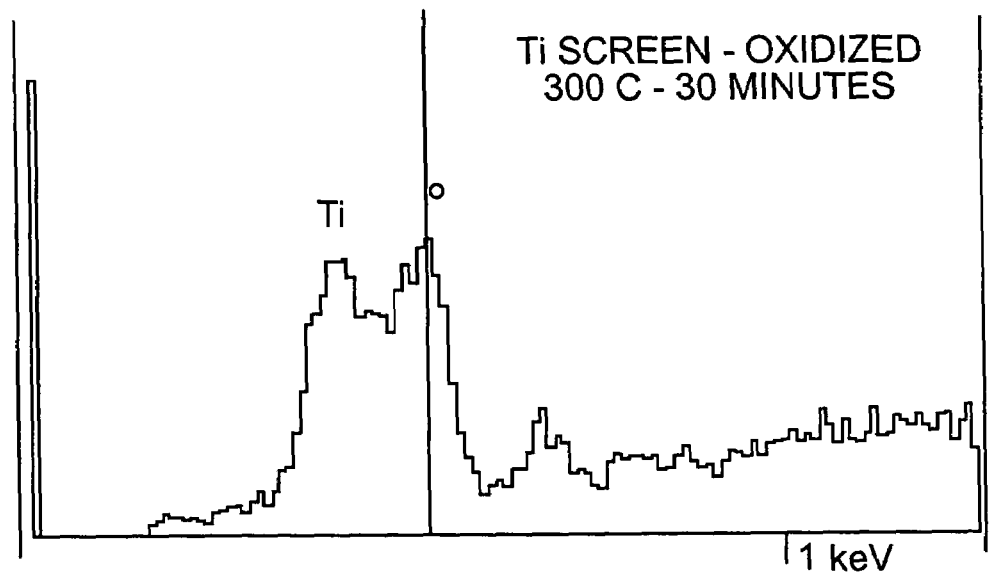

Comparing the EDS spectra of FIGS. 2 and 3 shows oxide thickening. In particular, FIG. 2 shows an EDS spectrum from a representative control group screen exhibiting an oxygen peak (at about 0.53 KeV) of a much lesser intensity than the nearby titanium peak. This peak height relationship indicates that the electron beam (which produces the x-rays that result in EDS spectra) is readily penetrating the very thin surface oxide layer. Consequently, the x-ray return is proportionately more intense from the underlying titanium metal substrate than from the surface oxide.

In FIG. 3, representing a typical conditioned (oxidized) screen sample, the oxygen peak is comparatively increased in intensity relative to the titanium peak. This signifies a substantially thickened oxide such that a lesser portion of the 5 keV electron beam penetrates through the surface oxide to the substrate. Consequently, there is a relatively greater x-ray return from the oxide layer for this treated screen. Discharge results of Li/CF$_x$ cells containing the untreated titanium screens are set forth in Table 1 and in Table 2 for the thermally oxidized screens.

EXAMPLE II

Thirty-six substantially similar titanium screens were divided into twelve groups of three screens each. Each group was subjected to electrolytic oxidation or anodization at various applied voltages for various periods of time. In particular, suspending the titanium screens in an electrolytic bath performed the electrolytic oxidation (anodization). A piece of copper proportional to the screen being anodized served as the counter electrode. As current from a DC power supply passed through the bath, oxygen created at the titanium anode screen surface reacted with the metal, forming titanium oxide, the thickness of which varied as a function of current application. The electrolytic bath used to treat the titanium screens was a 10% oxalic acid solution. However, according to the present invention, almost any liquid capable of carrying current is useful for this purpose. Suitable liquids range from COCA COLA® to sulfuric acid. As set forth in Tables 3 to 14 below under the heading "screen type", the applied voltages ranged from 3 to 30 volts, with the time of application ranging from 0.5 to 60 seconds. Tables 3 to 14 list the discharge results of Li/CF$_x$ cells containing the variously anodized screens.

EXAMPLE III

Prismatic, 8.6 mm Li/CF$_x$ cells of a central cathode design were used as the test vehicles. The cells were constructed to deliver a theoretical capacity of 2.465 Ah, with 16% lithium excess, based on theoretical capacity. The various non-oxidized, thermally oxidized and electrolytically oxidized titanium screens listed in Tables 1 to 14 served as the cathodic current collectors. The anodes consisted of lithium (0.74±0.01 grams) pressed to nickel screens.

The cathode active material consisted of flourinated carbon mixed with 5%, by weight, PTFE. A charge of 3.15 grams of this active admixture was pressed to a conditioned titanium screen, i.e., conditioned either by thermal oxidation or electrolytic oxidation according to the present invention, and then heat-sealed into a non-woven polypropylene separator bag. One molar LiBF$_4$ in γ-butyrolactone served as the electrolyte (3.80±0.15 grams).

The cells containing the non-oxidized, thermally oxidized and electrolytically oxidized titanium screens were preconditioned at 37° C. by discharge under 1.5 kohm loads for 18 hours. After a one week open circuit storage period at 37° C., a 20 mA acceptance pulse train comprised of four pulses, each of a ten second duration immediately followed by a fifteen second rest period, was applied at 37° C. to each cell. After a ten day open circuit storage period at 37° C., the cells were subjected to elevated temperature storage consisting of five, sixty minute heat cycles at 130° C. for autoclave simulation. Discharge at 37° C. under 1-kohm loads was begun within 5 days after autoclave simulation. Closed circuit voltage and 1 kHz impedance readings were recorded daily throughout run-down. AC impedance spectra were also recorded prior to and following cell autoclave simulation.

Results:

Tables 1 to 14 list the discharge results of the various cell groups having the non-oxidized titanium screens (Table 1), the thermally oxidized titanium screens (Table 2) and the electrolytically oxidized titanium screens (Tables 3 to 14) prior to autoclave simulation.

TABLE 1

| Cell Serial number | Screen type | Last loaded voltage (mV) | Last loaded impedance (Ω) | Pulse 1 minimum (mV) | Pulse 4 minimum (mV) |
|---|---|---|---|---|---|
| 90388 | Untreated | 2729 | 4 | 2638 | 2355 |
| 90389 | | 2739 | 10 | 2605 | 2363 |
| 90390 | | 2734 | 10 | 2650 | 2363 |
| Mean | | 2734 | 8 | 2631 | 2360 |
| ±1 SD | | 5 | 3 | 23 | 5 |

TABLE 2

| Cell Serial number | Screen type | Last loaded voltage (mV) | Last loaded impedance (Ω) | Pulse 1 minimum (mV) | Pulse 4 minimum (mV) |
|---|---|---|---|---|---|
| 90394 | 300° C. for 30 min. in air | 2698 | 8 | 2250 | 2165 |
| 90395 | | 2648 | 9 | 2100 | 2050 |
| 90396 | | 2692 | 8 | 2230 | 2138 |
| Mean | | 2679 | 8 | 2193 | 2118 |
| ±1 SD | | 27 | 1 | 81 | 60 |

TABLE 3

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100302 | 5 V for 5 sec | 2673 | 11 | 2095 | 2012 |
| 100303 | | 2666 | 11 | 2024 | 1960 |
| 100304 | | 2669 | 11 | 2034 | 1948 |
| Mean | | 2669 | 11 | 2051 | 1973 |
| ±1 SD | | 4 | 0 | 38 | 34 |

TABLE 4

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100305 | 10 V for 5 sec | 2637 | 10 | 1938 | 1895 |
| 100306 | | 2650 | 13 | 1929 | 1848 |
| 100307 | | 2633 | 15 | 1765 | 1675 |
| Mean | | 2640 | 13 | 1877 | 1806 |
| ±1 SD | | 9 | 3 | 97 | 116 |

TABLE 5

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100308 | 10 V for 15 sec | 2654 | 11 | 2065 | 2000 |
| 100309 | | 2653 | 11 | 2139 | 2078 |
| 100310 | | 2640 | 12 | 2031 | 1980 |
| Mean | | 2649 | 11 | 2078 | 2019 |
| ±1 SD | | 8 | 1 | 55 | 52 |

TABLE 6

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100311 | 10 V for 30 sec | 2640 | 11 | 2046 | 1992 |
| 100312 | | 2651 | 10 | 2029 | 1975 |
| 100313 | | 2667 | 11 | 2151 | 2087 |
| mean | | 2653 | 11 | 2075 | 2018 |
| ±1 SD | | 14 | 1 | 66 | 60 |

TABLE 7

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100314 | 10 V for 60 sec | 2638 | 10 | 1851 | 1846 |
| 100315 | | 2657 | 10 | 1907 | 1853 |
| 100316 | | 2646 | 10 | 1926 | 1877 |
| Mean | | 2647 | 10 | 1895 | 1859 |
| ±1 SD | | 10 | 0 | 39 | 16 |

TABLE 8

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100317 | 15 V for 5 sec | 2637 | 10 | 1816 | 1799 |
| 100318 | | 2650 | 10 | 1892 | 1851 |
| 100319 | | 2649 | 10 | 1921 | 1882 |

TABLE 8-continued

| Cell Serial number | Screen type | Last loaded voltage (mV) | Last loaded impedance (Ω) | Pulse 1 minimum (mV) | Pulse 4 minimum (mV) |
|---|---|---|---|---|---|
| Mean | | 2645 | 10 | 1876 | 1844 |
| ±1 SD | | 7 | 0 | 54 | 42 |

TABLE 9

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100320 | 20 V for 5 sec | 2637 | 13 | 1785 | 1777 |
| 100321 | | 2648 | 11 | 1912 | 1848 |
| 100322 | | 2654 | 11 | 1992 | 1914 |
| Mean | | 2646 | 12 | 1896 | 1846 |
| ±1 SD | | 9 | 1 | 104 | 69 |

TABLE 10

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100323 | 25 V for 5 sec | 2660 | 15 | 1953 | 1897 |
| 100324 | | 2634 | 12 | 1841 | 1829 |
| 100325 | | 2643 | 13 | 1736 | 1785 |
| Mean | | 2646 | 13 | 1843 | 1837 |
| ±1 SD | | 13 | 2 | 109 | 56 |

TABLE 11

| Cell Serial number | Screen type | Last loaded voltage (mV) | Last loaded impedance (Ω) | Pulse 1 minimum (mV) | Pulse 4 minimum (mV) |
|---|---|---|---|---|---|
| 100326 | 30 V for 5 sec | 2658 | 11 | 1980 | 1924 |
| 100327 | | 2642 | 12 | 1965 | 1916 |
| 100328 | | 2642 | 12 | 1924 | 1877 |
| Mean | | 2647 | 12 | 1956 | 1905 |
| ±1 SD | | 9 | 1 | 29 | 24 |

TABLE 12

| Cell Serial number | Screen type | Last loaded voltage (mV) | Last loaded impedance (Ω) | Pulse 1 minimum (mV) | Pulse 4 minimum (mV) |
|---|---|---|---|---|---|
| 102333 | 3 V for 1 sec | 2726 | 11 | 2566 | 2366 |
| 102334 | | 2733 | 9 | 2673 | 2334 |
| 102335 | | 2724 | 11 | 2544 | 2236 |
| Mean | | 2728 | 10 | 2594 | 2279 |
| ±1 SD | | 5 | 1 | 69 | 50 |

TABLE 13

| Cell Serial number | Screen type | Last loaded voltage (mV) | Last loaded impedance (Ω) | Pulse 1 minimum (mV) | Pulse 4 minimum (mV) |
|---|---|---|---|---|---|
| 102336 | 5 V for 1 sec | 2690 | 10 | 2717 | 2485 |
| 102337 |  | 2706 | 10 | 2454 | 2346 |
| 102338 |  | 2700 | 10 | 2212 | 2007 |
| mean |  | 2699 | 10 | 2461 | 2279 |
| ±1 SD |  | 8 | 0 | 253 | 246 |

TABLE 14

| Cell Serial number | Screen type | Last loaded voltage (mV) | Last loaded impedance (Ω) | Pulse 1 minimum (mV) | Pulse 4 minimum (mV) |
|---|---|---|---|---|---|
| 102339 | 5 V for 0.5 sec | 2700 | 11 | 2217 | 2036 |
| 102340 |  | 2713 | 10 | 2400 | 2117 |
| 102341 |  | 2691 | 11 | 2048 | 1946 |
| Mean |  | 2701 | 11 | 2222 | 2033 |
| ±1 SD |  | 11 | 1 | 176 | 855 |

As set forth in the tables, the cells having thermally and electrolytically oxidized titanium screens had lower pulse 1 voltage minima under a 20 mA pulse than cells fabricated with untreated titanium current collectors. However, the voltages of cells with thermally oxidized screens and some of them with electrolytically oxidized screens did not fall below 2 volts.

Figure 4:
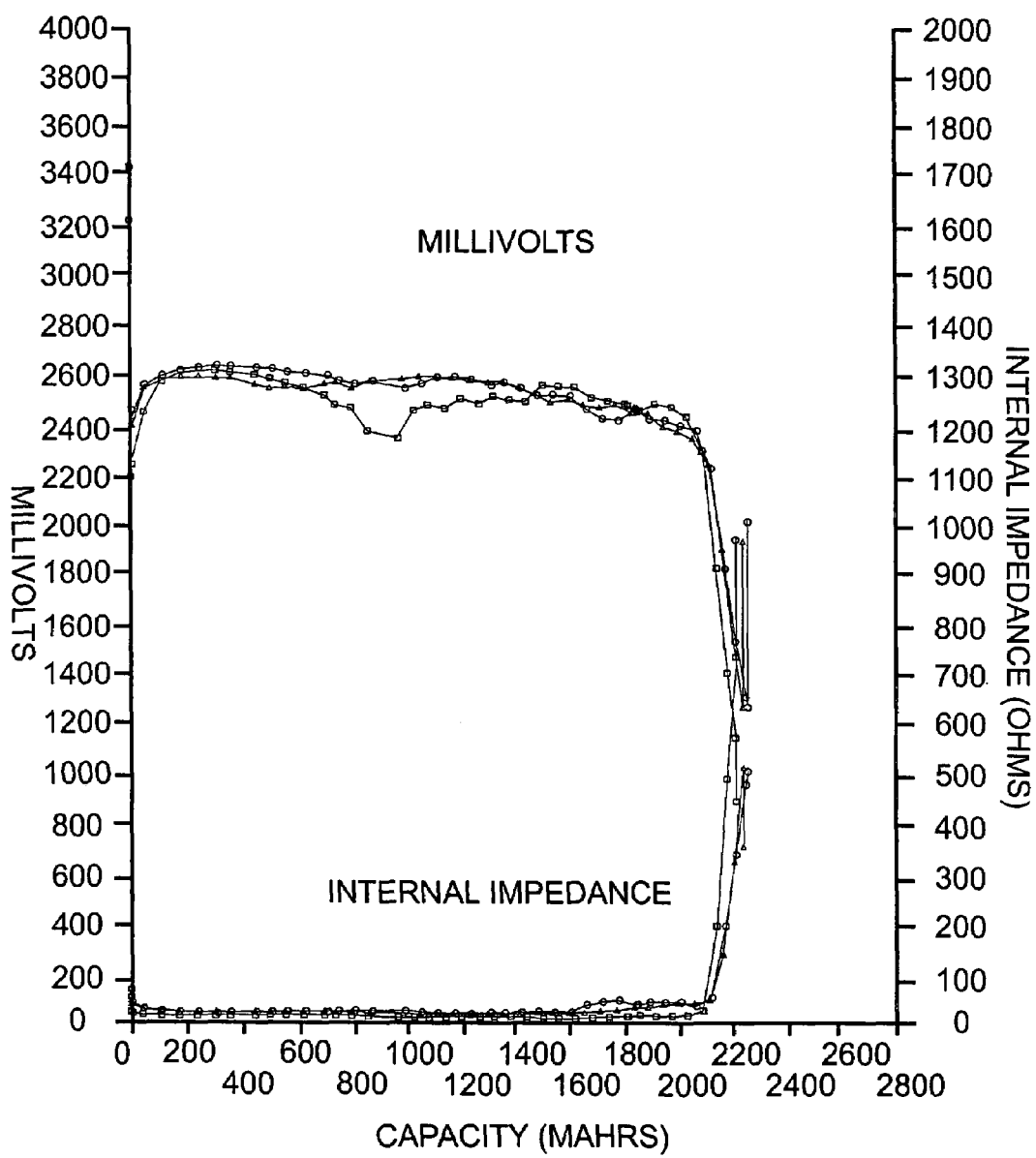
FIG. 4 is a graph of the discharge profiles of various heat exposed Li/CF$_x$ cells using as received, untreated titanium screens as the cathode current collector.
Figure 5:
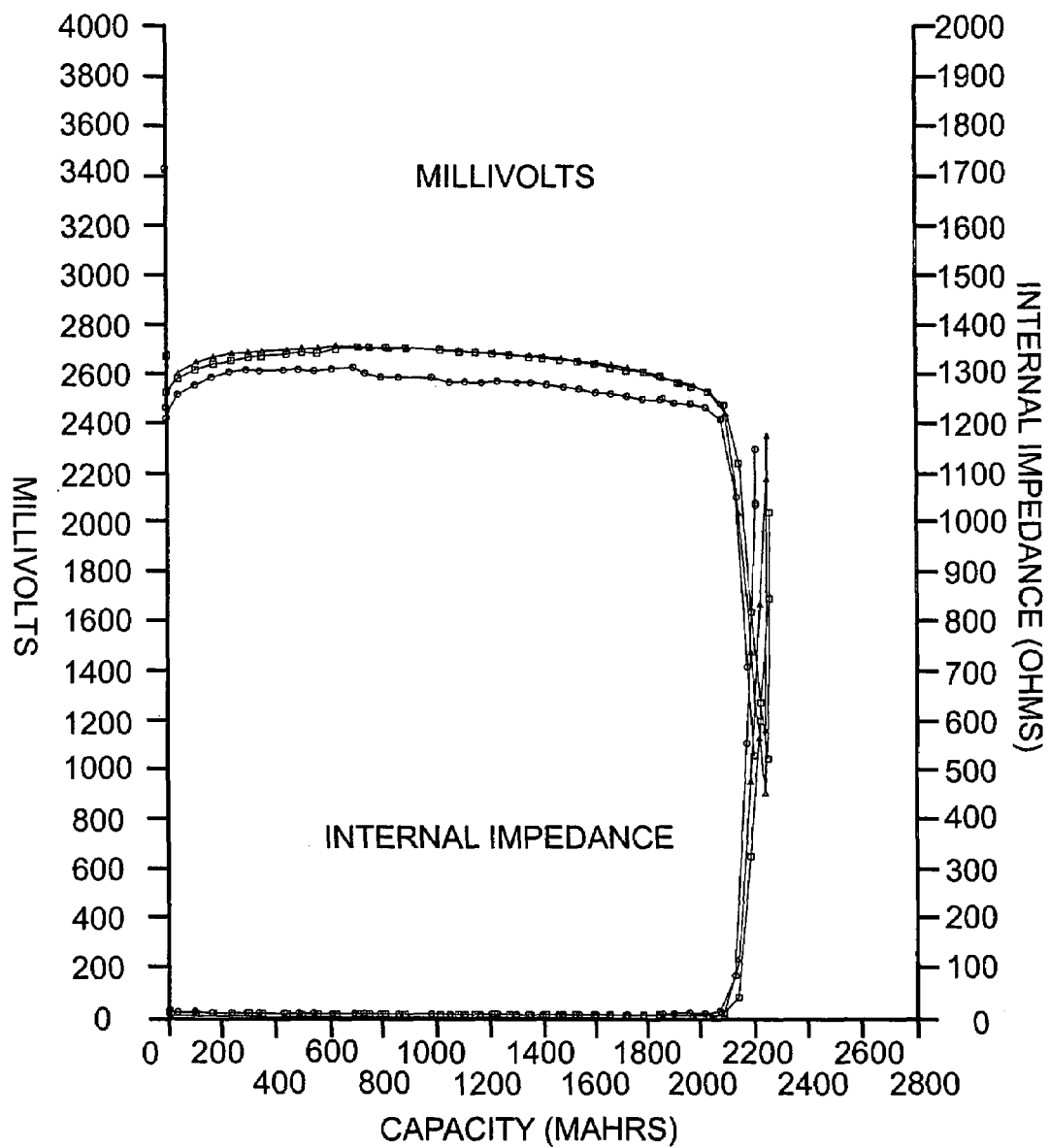
FIGS. 5 and 6 are graphs of the discharge profiles of various heat-exposed Li/CF$_x$ cells having thermally oxidized and electrolytically oxidized titanium screens as the cathode current collector, respectively.
Figure 6:
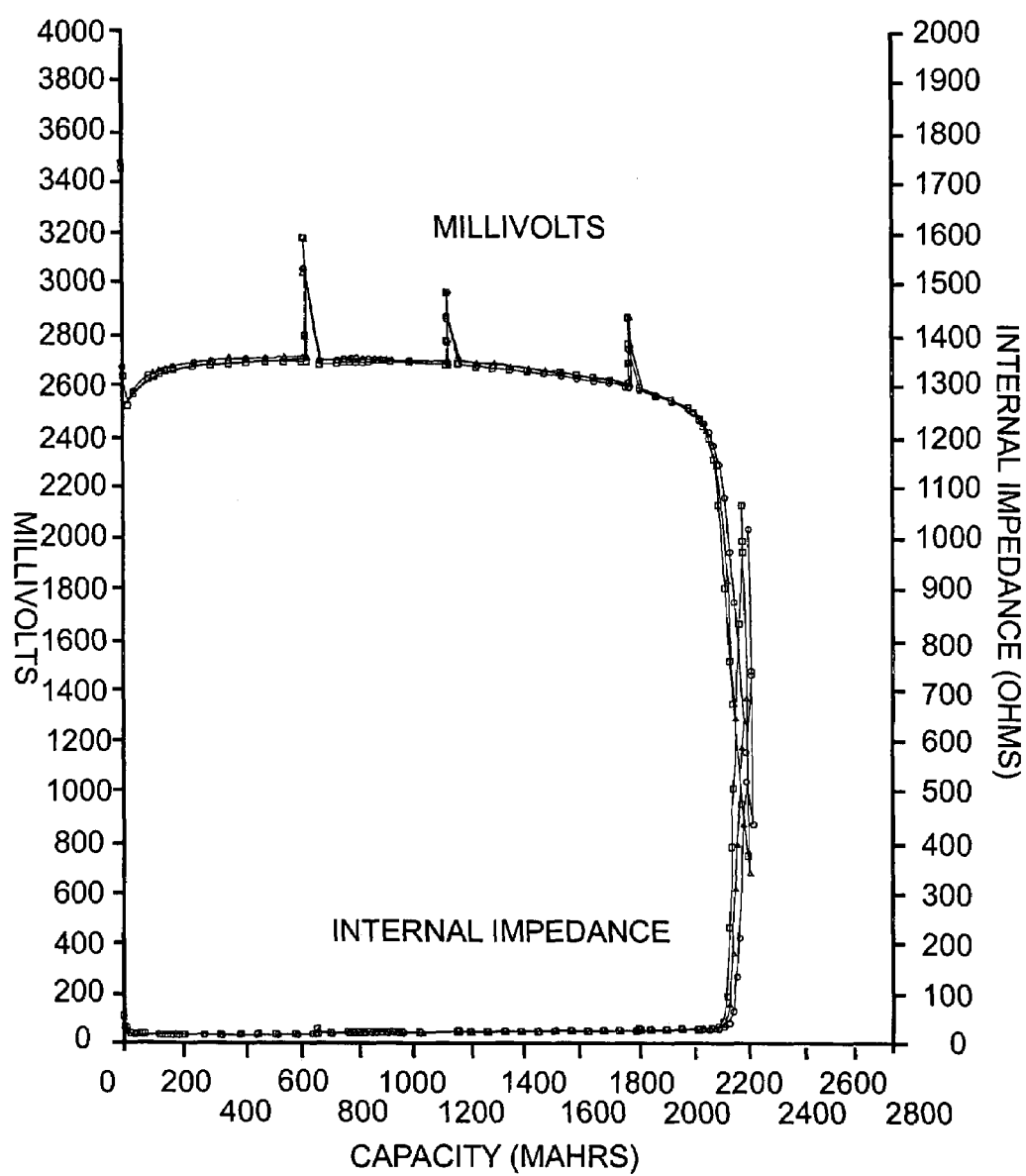
Figure 7:
FIGS. 7 and 8 are electron micrograph (SEM) photos of a representative untreated titanium cathode current collector screen at 100× and 1000×, respectively.
Figure 8:
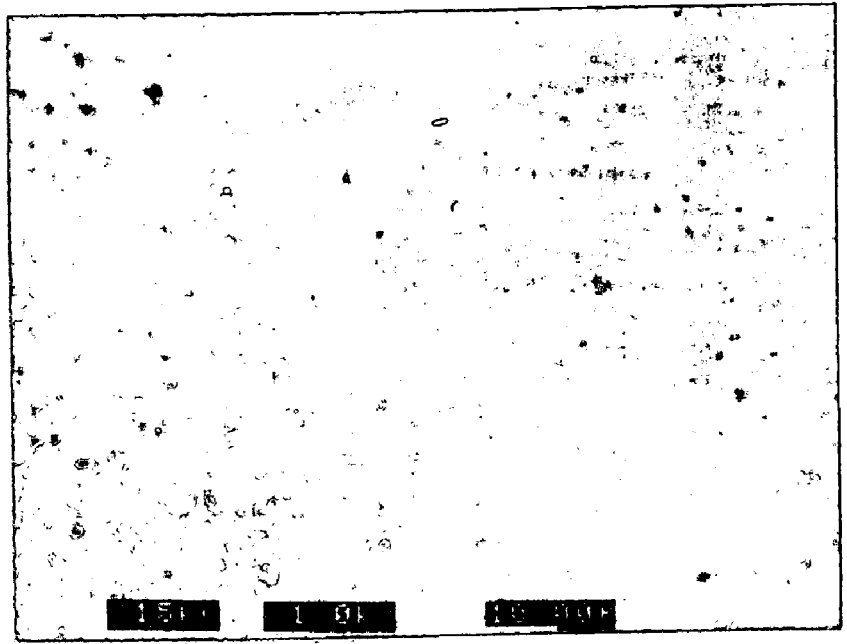
Figure 9:
FIGS. 9 and 10 are electron micrograph (SEM) photos of a representative thermally oxide-thickened titanium cathode current collector screen at 100× and 1000×, respectively.
Figure 10:
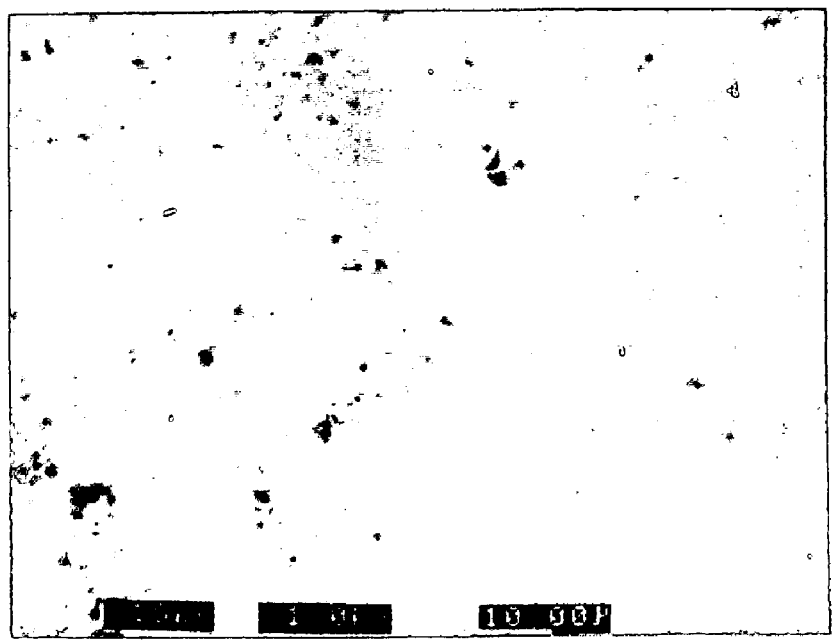

As can be seen in FIG. 4, the discharge profiles of Li/CF$_x$ cells subjected to elevated temperature storage and using as-received, untreated titanium screens were erratic. This condition is eliminated through the use of oxidized titanium current collectors. The discharge results of the cells set forth in Tables 2 and 13 are illustrated in FIGS. 5 and 6, respectively. The cells of Table 2 containing screens thermally oxidized at 300° C. for 30 minutes in air exhibited smooth discharge profiles with higher running voltages than the electrolytically oxidized cells of Table 13 (anodized at 5 volts for 1 sec).

Another difference between the cell groups is the internal impedance recorded during discharge. For the cells using as-received titanium screens (FIG. 4), the internal impedance is higher throughout cell life than the impedance of cells having conditioned titanium screens. The cell groups used to construct FIGS. 5 and 6 oxidized by either treatment show this. According to the present invention, a cell exhibiting reduced impedance is advantageous for applications in which clarity of transmission signal is required.

EXAMPLE IV

As listed in Table 16, the mean discharge capacity of Li/CF$_x$ cells subjected to elevated temperature storage and using oxidized titanium screen was 2,147±12 mAh to a 2 volt cut-off. In comparison, the mean capacity of Li/CF$_x$ cells subjected to elevated temperature storage and using untreated titanium a screen was 2,153±16 mAh to 2 volts, as listed in Table 15. The results in Table 15 are from the cells in Table 1 and the results in Table 16 are from the cells set forth in Table 2. When normalized with respect to cathode weight, the mean gravimetric energy densities were 681.75±5.32 mAh/grams for the cells subjected to autoclave simulation with untreated cathode screens (Tables 1 and 15) and 679.61±4.00 mAh/grams for those cells using oxidized titanium current collectors (Tables 2 and 16). Although the mean delivered capacity is lower for the cells subjected to elevated temperature storage using the oxidized screens, the difference is not statistically significant.

Also listed in Tables 15 and 16 are the running voltages and watt-hours delivered to 2 volts. The Li/CF$_x$ cells subjected to elevated temperature storage utilizing oxidized titanium screen cathodic current collectors according to the present invention had higher running voltages, and thus higher energies, than the Li/CF$_x$ cells with as-received titanium screens according to the prior art.

TABLE 15

| Cell Serial number | Screen type | Running voltage, V | Capacity to 2 V, Ah | Energy to 2 V, Wh |
|---|---|---|---|---|
| 90388 | Untreated | 2.56 | 2.135 | 5.47 |
| 90389 |  | 2.60 | 2.163 | 5.62 |
| 90390 |  | 2.60 | 2.162 | 5.62 |
| Mean |  | 2.59 | 2.153 | 5.57 |
| ±1 SD |  | 0.02 | 0.016 | 0.09 |

TABLE 16

| Cell Serial number | Screen type | Running voltage, V | Capacity to 2 V, Ah | Energy to 2 V, Wh |
|---|---|---|---|---|
| 90394 | 300° C. for 30 minutes In air | 2.70 | 2.159 | 5.83 |
| 90395 |  | 2.60 | 2.135 | 5.55 |
| 90396 |  | 2.70 | 2.146 | 5.79 |
| Mean |  | 2.67 | 2.147 | 5.72 |
| ±1 SD |  | 0.06 | 0.012 | 0.15 |

Table 17 presents the closed circuit voltages, impedances, and delivered capacities of the cells subjected to elevated temperature storage and using screens anodized by various voltage/time condition combinations. In particular, the results from the Li/CF$_x$ cells presented in Tables 12 to 14 are set forth in Table 17 along with newly presented cell serial numbers 102342 to 102344 having untreated titanium cathode current collector screens. In addition, the voltage minima recorded for pulse 1 and pulse 4 wave trains under a 20 mA four-wave pulse train applied at 0%, 30%, 60%, and 90% depths-of-discharge are listed. The pulse train is similar to that described in Example II.

According to the present invention, anodization treatment of a titanium screen provides a titanium oxide layer that protects the titanium metal surface from reaction forming species capable of reducing electron-transporting capability. Anodization treatments at a potential of 5 volts applied for either 0.5 or 1 second, as described herein, did not result in a measurable increase in the electrical resistance of the screen/cathode interface.

TABLE 17

| Serial number | Screen type | Running voltage, V | Internal impedance, Ω | Capacity to 2 V, Ah | Energy to 2 V, Wh | 30% DOD pulse 1 min voltage, mV | 30% DOD pulse 4 min voltage, mV | 60% DOD pulse 1 min voltage mV | 60% DOD pulse 4 min voltage mV | 90% DOD pulse 1 min voltage, mV | 90% DOD pulse 4 min voltage mV |
|---|---|---|---|---|---|---|---|---|---|---|---|
| 102333 | 3 V for 1 sec | 2.70 | 10 | 2.122 | 5.73 | 2290 | 2261 | 2334 | 2307 | 2207 | 2178 |
| 102334 | | 2.65 | 13 | 2.195 | 5.82 | 2004 | 1995 | 2002 | 1987 | 1919 | 1897 |
| 102335 | | 2.67 | 11 | 2.183 | 5.83 | 2102 | 2080 | 2195 | 2170 | 1931 | 1907 |
| Mean | | 2.67 | 11 | 2.167 | 5.79 | 2132 | 2112 | 2177 | 2155 | 2019 | 1994 |
| ±1 SD | | 0.03 | 2 | 0.039 | 0.06 | 145 | 136 | 167 | 161 | 163 | 159 |
| 102336 | 5 V for 1 sec | 2.69 | 5 | 2.176 | 5.85 | 2244 | 2222 | 2537 | 2524 | 2131 | 2109 |
| 102337 | | 2.69 | 5 | 2.201 | 5.92 | 2271 | 2246 | 2527 | 2517 | 2078 | 2058 |
| 102338 | | 2.70 | 5 | 2.185 | 5.90 | 2319 | 2292 | 2344 | 2319 | 2153 | 2129 |
| mean | | 2.69 | 5 | 2.187 | 5.89 | 2278 | 2253 | 2469 | 2453 | 2121 | 2099 |
| ±1 SD | | 0.01 | 0 | 0.013 | 0.04 | 38 | 36 | 109 | 116 | 39 | 37 |
| 102339 | 5 V for 0.5 sec | 2.69 | 5 | 2.197 | 5.91 | 2263 | 2239 | 2271 | 2253 | 2266 | 2244 |
| 102340 | | 2.69 | 5 | 2.218 | 5.97 | 2236 | 2209 | 2239 | 2217 | 2095 | 2073 |
| 102341 | | 2.70 | 5 | 2.164 | 5.84 | 2317 | 2285 | 2280 | 2253 | 2097 | 2073 |
| Mean | | 2.69 | 5 | 2.193 | 5.91 | 2272 | 2244 | 2263 | 2241 | 2153 | 2130 |
| ±1 SD | | 0.01 | 0 | 0.027 | 0.07 | 41 | 38 | 22 | 21 | 98 | 99 |
| 102342 | Untreated | 2.70 | 13 | 2.174 | 5.87 | 2209 | 2183 | 2173 | 2148 | 2017 | 1990 |
| 102343 | | 2.69 | 13 | 2.214 | 5.96 | 2212 | 2183 | 2207 | 2183 | 1985 | 1965 |
| 102334 | | 2.69 | 13 | 2.188 | 5.89 | 2129 | 2102 | 2034 | 2019 | 1646 | 1643 |
| Mean | | 2.69 | 13 | 2.192 | 5.91 | 2183 | 2156 | 2138 | 2117 | 1883 | 1866 |
| ±1 SD | | 0.01 | 0 | 20 | 0.05 | 47 | 47 | 92 | 86 | 206 | 19 |

EXAMPLE V

Figure 11:
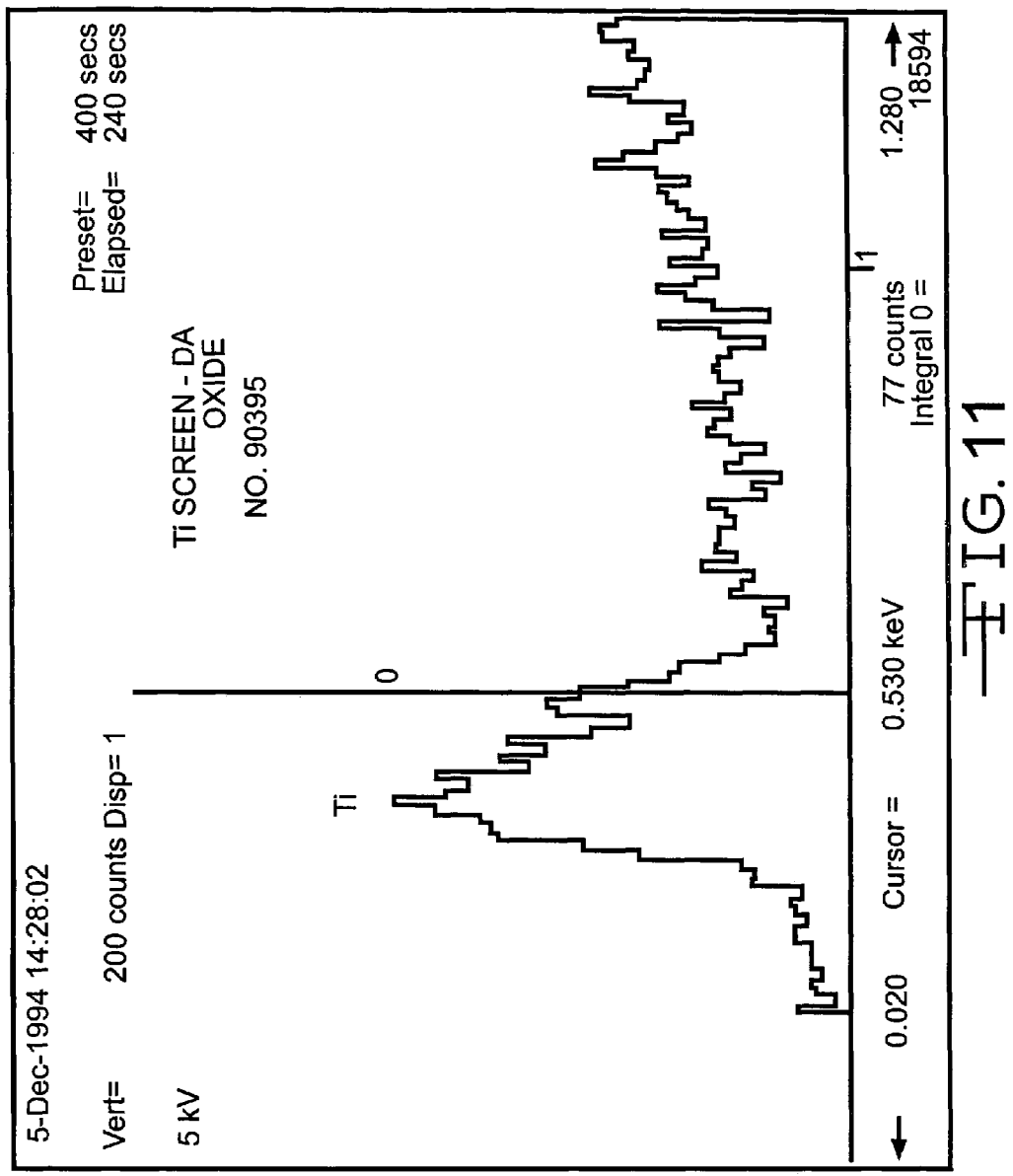
FIGS. 11 and 12 are the EDS spectra of a thermally oxide-thickened titanium current collector screen and an untreated titanium screen, respectively, after destructive analysis of discharged and autoclaved Li/CF$_x$ cells.
Figure 12:
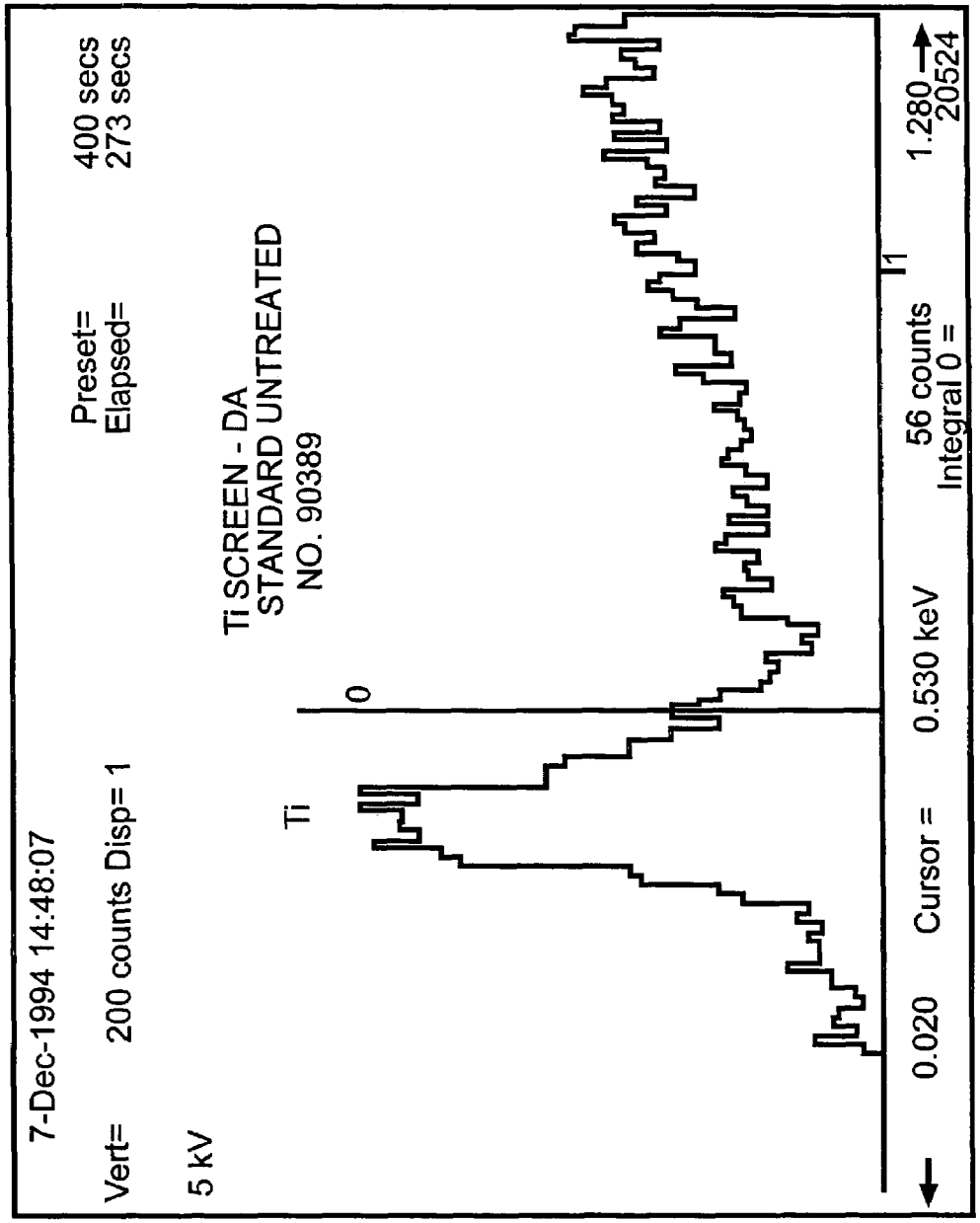

Following discharge, the Li/CF$_x$ cells were disassembled and the cathode screens investigated for possible corrosion. As shown in FIGS. 7 to 10, the scanning electron micrograph (SEM) photos reveal that there is no appreciable enhancement of undesirable screen pitting due to thermal oxidation when compared with standard, untreated screens. EDS spectra representing the outer surfaces of screens taken from the disassembled (DA) cells are shown in FIGS. 11 and 12. That the thickened oxide layer resulting from thermal oxidation remains at least partially intact after discharge can be seen by noting the relative peak heights for oxygen and titanium. The EDS spectrum in FIG. 11 is typical of the thermally oxidized screens of the present invention. The oxygen peak height is greater than half that of the Ti peak. FIG. 12 is an EDS spectrum representing as-received (untreated) screens after discharge. As shown, the oxygen peak stands much lower, which is typical for titanium screens not thermally or electrolytically oxidized.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) a casing of titanium comprising an outer layer consisting essentially of titanium oxide;
   b) a first electrode;
   c) a second, counter electrode comprising a titanium current collector provided with an outer layer consisting essentially of titanium oxide having a thickness from about 135 nm to about 240 nm contacted by an electrode active material;
   d) a separator position intermediate the first and second electrodes to prevent direct physical contact between them; and
   e) an electrolyte activating the first electrode in electrical association with the second electrode housed in the casing.

2. The electrochemical cell of claim 1 wherein the titanium current collector is either a screen or a foil.

3. The electrochemical cell of claim 1 wherein the electrode active material is selected from the group consisting of silver vanadium oxide, copper silver vanadium oxide, copper vanadium oxide, manganese dioxide, cobalt oxide, nickel oxide, copper oxide, titanium disulfide, copper sulfide, iron sulfide, iron disulfide, carbon, fluorinated carbon, and mixtures thereof.

4. The electrochemical cell of claim 1 wherein the electrode active material is selected from the group consisting of a carbonaceous material, a metal, a metal oxide, a mixed metal oxide, a metal sulfide, and mixtures thereof.

5. The electrochemical cell of claim 1 wherein the electrode active material further comprises at least one of a binder material and a conductive additive.

6. The electrochemical cell of claim 5 wherein the binder material is selected from the group consisting of polytetrafluoroethylene, polyvinylidene fluoride, polyethylenetetrafluoroethylene, polyamides, polyimides, and mixtures thereof.

7. The electrochemical cell of claim 5 wherein the conductive additive is selected from the group consisting of carbon, graphite powder, acetylene black, titanium powder, aluminum powder, nickel powder, stainless steel powder, and mixtures thereof.

8. An electrochemical cell, which comprises:
   a) a casing of titanium comprising an outer layer consisting essentially of titanium oxide;
   b) an anode;
   c) a cathode comprising a titanium current collector provided with an outer layer consisting essentially of titanium oxide having a thickness from about 135 nm to about 240 nm contacted by fluorinated carbon;
   d) a separator position intermediate the anode and cathode to prevent direct physical contact between them; and
   e) an electrolyte activating the anode in electrical association with the cathode housed in the casing.

9. The electrochemical cell of claim 8 wherein the titanium current collector is either a screen or a foil.

10. An electrochemical cell, which comprises:
a) a casing of titanium comprising an outer layer consisting essentially of titanium oxide;
b) an anode;
c) a cathode comprising a cathode active material contacted to a titanium current collector, wherein the titanium current collector is provided with an outer layer consisting essentially of titanium oxide having a thickness from about 135 nm to about 240 nm in contact with the cathode active material; and
d) an electrolyte activating the anode in electrical association with the cathode housed in the casing.

11. The electrochemical cell of claim 10 wherein the titanium current collector is either a screen or a foil.

12. The electrochemical cell of claim 10 wherein the cathode active material is selected from the group consisting of silver vanadium oxide, copper silver vanadium oxide, copper vanadium oxide, manganese dioxide, cobalt oxide, nickel oxide, copper oxide, titanium disulfide, copper sulfide, iron sulfide, iron disulfide, carbon, fluorinated carbon, and mixtures thereof.

* * * * *